(12) United States Patent
Meyer

(10) Patent No.: US 7,173,983 B1
(45) Date of Patent: Feb. 6, 2007

(54) COFDM DEMODULATOR WITH FFT ANALYSIS WINDOW DISPLACEMENT COMPENSATION

(75) Inventor: Jacques Meyer, Saint Martin le Vinoux (FR)

(73) Assignee: STMicroelectronics S.A., Montrouge (FR)

( * ) Notice: Subject to any disclaimer, the term of this patent is extended or adjusted under 35 U.S.C. 154(b) by 0 days.

(21) Appl. No.: 09/720,132

(22) PCT Filed: Feb. 25, 2000

(86) PCT No.: PCT/FR00/00477

§ 371 (c)(1),
(2), (4) Date: Dec. 19, 2000

(87) PCT Pub. No.: WO00/51301

PCT Pub. Date: Aug. 31, 2000

(30) Foreign Application Priority Data

Feb. 26, 1999 (FR) .................................. 99 02653

(51) Int. Cl.
*H03D 1/00* (2006.01)
*H04L 27/06* (2006.01)
*H04L 7/00* (2006.01)
*H04J 11/00* (2006.01)

(52) U.S. Cl. .................. 375/340; 375/344; 375/367; 370/203

(58) Field of Classification Search ........ 375/340–367, 375/326; 712/35; 708/501; 370/203
See application file for complete search history.

(56) References Cited

U.S. PATENT DOCUMENTS

| 4,638,349 | A | * | 1/1987 | Le Floch | 348/639 |
| 5,506,836 | A | * | 4/1996 | Ikeda et al. | 370/203 |
| 5,640,426 | A | * | 6/1997 | Ishizu | 375/326 |
| 6,215,819 | B1 | * | 4/2001 | Hyakudai et al. | 375/240 |
| 6,226,337 | B1 | * | 5/2001 | Klank et al. | 375/367 |
| 6,330,293 | B1 | * | 12/2001 | Klank et al. | 375/344 |
| 6,549,589 | B1 | * | 4/2003 | Tsuruoka | 375/343 |
| 6,606,700 | B1 | * | 8/2003 | Sih et al. | 712/35 |

\* cited by examiner

*Primary Examiner*—Khai Tran
*Assistant Examiner*—Cicely Ware
(74) *Attorney, Agent, or Firm*—Lisa K. Jorgenson; E. Russell Tarleton; Seed IP Law Group PLLC

(57) ABSTRACT

A COFDM demodulator including a fast Fourier transform circuit analyzing a received signal in a window corresponding to one symbol, each symbol carrying several phase and amplitude modulated carriers, some of which are shifted in frequency in a predetermined way from one symbol to the next one to form pilots; a bidimensional filter for interpolating, from anchors corresponding to the pilots such as received from several consecutive symbols, the distortion undergone by each carrier; and a circuit for correcting the shifting of the window with respect to an optimal position. The demodulator includes a circuit for correcting each distortion according to window shifting corrections performed respectively for the symbol associated with the distortion and for the symbols associated with the anchors used to interpolate the distortion.

14 Claims, 7 Drawing Sheets

COFDM DEMODULATOR WITH FFT ANALYSIS WINDOW DISPLACEMENT COMPENSATION

BACKGROUND OF THE INVENTION

1. Field of the Invention

The present invention relates to a COFDM ("Coded Orthogonal Frequency Division Multiplex") demodulator, and more specifically to such a demodulator used for radio transmissions.

2. Description of the Related Art

FIG. 1 is intended for illustrating the principle of a COFDM modulation. Data packets to be transmitted are put in the form of N complex coefficients associated with N respective frequencies. The number N of frequencies is a power of 2, equal, for example, to 8192 (digital television diffusion). Each complex coefficient corresponds to a vector that is illustrated in FIG. 1 as starting from a frequency axis at a point indicating the frequency associated with the coefficient.

The N coefficients are processed by inverse fast Fourier transform (IFFT), which generates a "symbol" formed of a sum of modulated carriers, each carrier having the amplitude and the phase determined by the associated complex coefficient. The symbol thus generated is transmitted and a receiver submits it to the inverse processing, that is, a fast Fourier transform (FFT) to restore the initial complex coefficients.

As shown in FIG. 1, some regularly distributed vectors P1, P2, P3 . . . have a known constant value. These vectors, or the corresponding carriers, are called the pilot carriers. They are used to reflect the distortions undergone by the transmitted signal and to interpolate the corrections to be performed on the unknown vectors located between the pilots.

FIG. 2 illustrates a transmission of several successive symbols Sn-1, Sn . . . As shown, each of these symbols is preceded by a guard interval G that is a copy of a portion of the end of the corresponding symbol. The guard intervals are used to avoid inter-symbol modulation distortions caused by an echo of the transmission at the receive level. FIG. 2 also shows an echo SEn-1, GEn-1 . . . of the transmitted signal. This echo is delayed with respect to the main signal by a duration shorter than that of a guard interval G.

Each symbol S is normally analyzed by the FFT circuit of the receiver in a window W of the same length as the symbol. If there were no guard interval, an analysis window W coinciding with a symbol of the main signal would straddle two symbols of the echo signal. This would result in an error difficult to correct in the FFT.

Guard interval G, provided that it is greater than the echo delay, provides an adjustment margin of analysis window W so that it only coincides with portions belonging to the same symbol, in the main signal as well as in the echo. The fact that an analysis window straddles a symbol and its guard interval only results in a phase-shift that is corrected, in particular, by means of the above-mentioned pilot carriers.

FIG. 3 illustrates a method used in a conventional COFDM demodulator, such as described in French patent 2,743,967 to find the symbol beginnings, at the beginning of a reception, this to adjust analysis window W. A correlation product between the received signal and this same signal delayed by one symbol is performed. This enables detecting the time when each guard interval of the delayed signal coincides with an identical portion of the received signal, that is, the end of the corresponding symbol in the received signal.

Correlation product C, initially zero, starts progressively increasing from the beginning of each guard interval of the delayed signal. The maximum value is reached at the end of the guard interval, after which correlation product C starts decreasing to reach value zero. In the presence of an echo signal, the correlation peaks are lower and shift in the echo direction, so that they quite well show where the analysis windows are to start.

However, signals are most often noise-infested and it is difficult to determine the position of the correlation peaks with sufficient precision. For this purpose, the circuit described in the above-mentioned French patent enables refining the position, upon circuit setting, by analyzing the pulse response of the channel. Of course, the received signal may undergo frequency or phase drifts in operation, whereby the position of the windows must be regularly revised as will be described hereafter.

FIG. 4 very schematically shows the architecture of a COFDM demodulator such as described in the above-mentioned French patent. It is a system for receiving radio-transmitted digital television signals. In a radio transmission, the symbols are carried by a carrier of high frequency, which frequency is lowered by a tuner not shown. An element 10 of the architecture of FIG. 4 extracts the symbols from this carrier and converts them into digital. An element 12 determines the position of the analysis windows, as described in relation with FIG. 3, and readjusts, if necessary, the position of the analysis windows. The FFT is performed at 14 with the windows determined at 12. The coefficients provided by the FFT are put to wait at 16 to interpolate at 18 the distortions undergone by the coefficients. The distortions, which are complex numbers, are used to correct the coefficients at 20.

The pulse response of the channel is calculated at 22 based on the distorted pilots such as received. This pulse response enables determining whether the analysis window position is correct or whether it must be modified. The optimal window position is obtained when the power of the pulse response is maximum.

As indicated previously, each symbol includes pilots of known identical characteristics (they generally have a unity amplitude and a null or 180° phase, according to a law known by the receiver). The pilots such as received by the demodulator reflect the distortions undergone by the pilots. The value of the distortion is $A_p=P_p/E_p$, where $P_p$ is the value of the received pilot of position p and $E_p$ is the value of the corresponding transmitted pilot. A distortion $A_p$ is currently called an "anchor". These anchors are used to calculate by interpolation the distortions, noted $d_k$ hereafter (k≠p), at the positions k having no pilot.

The error correction at 20 consists of calculating the ratio of the coefficients such as received and of the respective interpolated distortions: $D_k=R_k/d_k$, where $D_k$ is the corrected value and $R_k$ is the received value.

Given that the pilots do not carry data, their number is desired to be limited. However, the smaller the number of pilots, the more interpolation errors between two consecutive pilots are made. To improve this situation, the pilots are shifted by several positions from one symbol to the next one and a bidimensional interpolation is performed on several consecutive symbols. In the example described hereafter, each symbol includes one pilot every twelve positions and the pilots are shifted by three positions from one symbol to the next one.

FIG. 5 illustrates this bidimensional interpolation. It shows an array, the rows of which correspond to consecutive symbols, the last received symbol being at the last row. The array columns correspond to the successive symbol carrier positions or frequencies. Hatched squares correspond to the received anchors. Due to the shifting of the pilots from one symbol to the next one, close anchors appear in some columns (every three columns in the present example).

All the distortions are first interpolated in the columns containing the anchors. Then, a finite impulse response filter 24 interpolates the missing distortions of each row.

With the above-mentioned example, the distortions of a symbol n-3 can be interpolated at the time when symbol n is received. Further, the interpolation of some distortions of symbol n-3 will require anchors of prior symbols, back to symbol n-6. This method thus requires completely storing symbols n-1 to n-3 and also storing the anchors only of symbols n-4 to n-6.

An interpolated, distortion of position k in a symbol n expresses as:

$$d_{n,k} = \left(1 - \frac{s}{4}\right) A_{n-s,k} + \frac{s}{4} A_{n+4-s,k} \quad (1)$$

where terms A are the received anchors and where s=(n modulo 4−k/3 modulo 4) modulo 4.

As an example, with this expression, the interpolated distortion in third position of symbol n-3 in FIG. 5 is expressed as $\frac{3}{4}A_{n-4} + \frac{1}{4}A_n$.

FIG. 6 schematically shows a distortion interpolation circuit 18 implementing the method of FIG. 5. Delay circuit 16 of FIG. 4 stores three consecutive symbols Sn-1, Sn-2, Sn-3 in a shift register. The received anchors $A_{n-1}$ to $A_{n-6}$ of six consecutive symbols necessary to interpolate the distortions in the columns are stored in six cascade-connected shift registers 26. Register 16 and the first register 26 receive current symbol Sn. A four-input multiplexer 28 receives on a first input the anchors of symbol Sn, multiplied by one quarter; on a second input, the anchors $A_{n-1}$ provided by the first register 26, multiplied by one half; on a third input, the anchors $A_{n-2}$ provided by the second register 26, multiplied by three quarters; and on its fourth and last input, the anchors $A_{n-3}$ provided by the third register 26.

A multiplexer 30 receives on a first input anchors $A_{n-4}$ provided by the fourth register 26, multiplied by three quarters; on a second input, anchors $A_{n-5}$ provided by the fifth register 26, multiplied by one half; on a third input, anchors $A_{n-6}$ provided by the sixth register 26, multiplied by one quarter; and on its last input, value 0. At 32, the sum of the outputs of multiplexers 28 and 30 is provided to filter 24. Multiplexers 28 and 30 are controlled by a same selection signal SEL that selects the adequate input of the multiplexers according to position k of the distortion to be interpolated.

As indicated previously, the position of the FFT analysis window is determined once, and for all in a setting phase. It is however provided to regularly check that the window position is good and to readjust this position if necessary. However, when the position of the analysis window is modified, the phase of each of the symbol carriers is correlatively modified, and this phase modification appears as a distortion that must be corrected. If the phase modification occurs for a current symbol n, the anchors of this current symbol will not have the same phase reference as the anchors of the preceding symbols, whereby it will be impossible to interpolate the distortions involving the anchors of symbol n.

FIG. 7 is intended for illustrating this phenomenon in further detail. This drawing shows a phase variation of an anchor of same position in consecutive symbols numbered from zero, this in the context of the example of FIG. 5 where an anchor is found at the same position every four symbols.

It is assumed that the received symbols regularly take advance on the fixed analysis window, which results in an increase of the anchor phase, as shown for symbols 0, 4, and 8, 12. The interpolated phases are marked with circles located on straight lines connecting the phase values of the anchors.

At the seventh symbol, the analysis window is advanced by an interval X to catch up on the symbol phase advance. As a result, the phase should evolve as indicated by squares, that is, continuing to regularly increase for symbols 5 and 6, abruptly dropping for symbol 7, and regularly increasing again. The phase drop is sensible for the first time in the anchor of symbol 8, and the errors interpolated for symbols 5 to 7, being located on the straight line connecting the phase values of the anchors of symbols 4 and 8, are erroneous. As a result, symbols 5 to 7 are lost, which loss is most often perceptible, especially on a television screen in the case where the symbols correspond to video signals.

When the receiver and the transmitter are at fixed positions, as it is in most cases, an analysis window readjustment seldom occurs and such signal disturbances may be acceptable.

However, it may be envisaged to use a receiver in a moving vehicle, such as a train, in which case the window readjustments should be frequent, making unacceptable the disturbances that this would cause.

BRIEF SUMMARY OF THE INVENTION

The present invention provides a COFDM demodulator that enables suppressing any disturbance due to a readjustment of the analysis window.

A COFDM demodulator is provided in accordance with one embodiment of the invention that includes a fast Fourier transform circuit analyzing a received signal in a window corresponding to one symbol, each symbol carrying several phase and amplitude modulated carriers, some of which, shifted in frequency in a predetermined way from one symbol to the next one, form pilots; a bidimensional filter for interpolating, from anchors corresponding to the pilots such as received from several consecutive symbols, the distortion undergone by each carrier; and means for correcting the window shifting with respect to an optimal position. The demodulator includes means for correcting each distortion according to window shifting corrections performed respectively for the symbol associated with the distortion and for the symbols associated with the anchors used to interpolate the distortion.

According to an embodiment of the present invention, the means for correcting the window shifting include a phase-locked loop synchronized on a correlation signal obtained by a correlation product between the received signal and this same signal delayed by one symbol, each symbol being preceded by a guard interval corresponding to a copy of the end of the symbol.

According to an embodiment of the present invention, each distortion is, in frequency after Fourier transform, a weighted sum of two anchors of the same position in a preceding symbol and in a following symbol, to which anchors have been added respective phases corresponding to the shiftings undergone by the analysis window for the preceding and following symbols, and to which anchors has been subtracted a phase corresponding to the shifting undergone by the analysis window for the symbol associated with the distortion.

BRIEF DESCRIPTION OF THE SEVERAL VIEWS OF THE DRAWINGS

The foregoing features and advantages of the present invention will be discussed in detail in the following non-limiting description of specific embodiments in connection with the accompanying drawings.

DETAILED DESCRIPTION OF THE INVENTION

To avoid interpolation errors caused by a bidimensional interpolation method when the position of an FFT analysis window is modified with respect to the received signal, the present invention provides involving in the interpolation calculations the phase shift caused, for each frequency, by the position modification of the analysis window.

Figure 5:
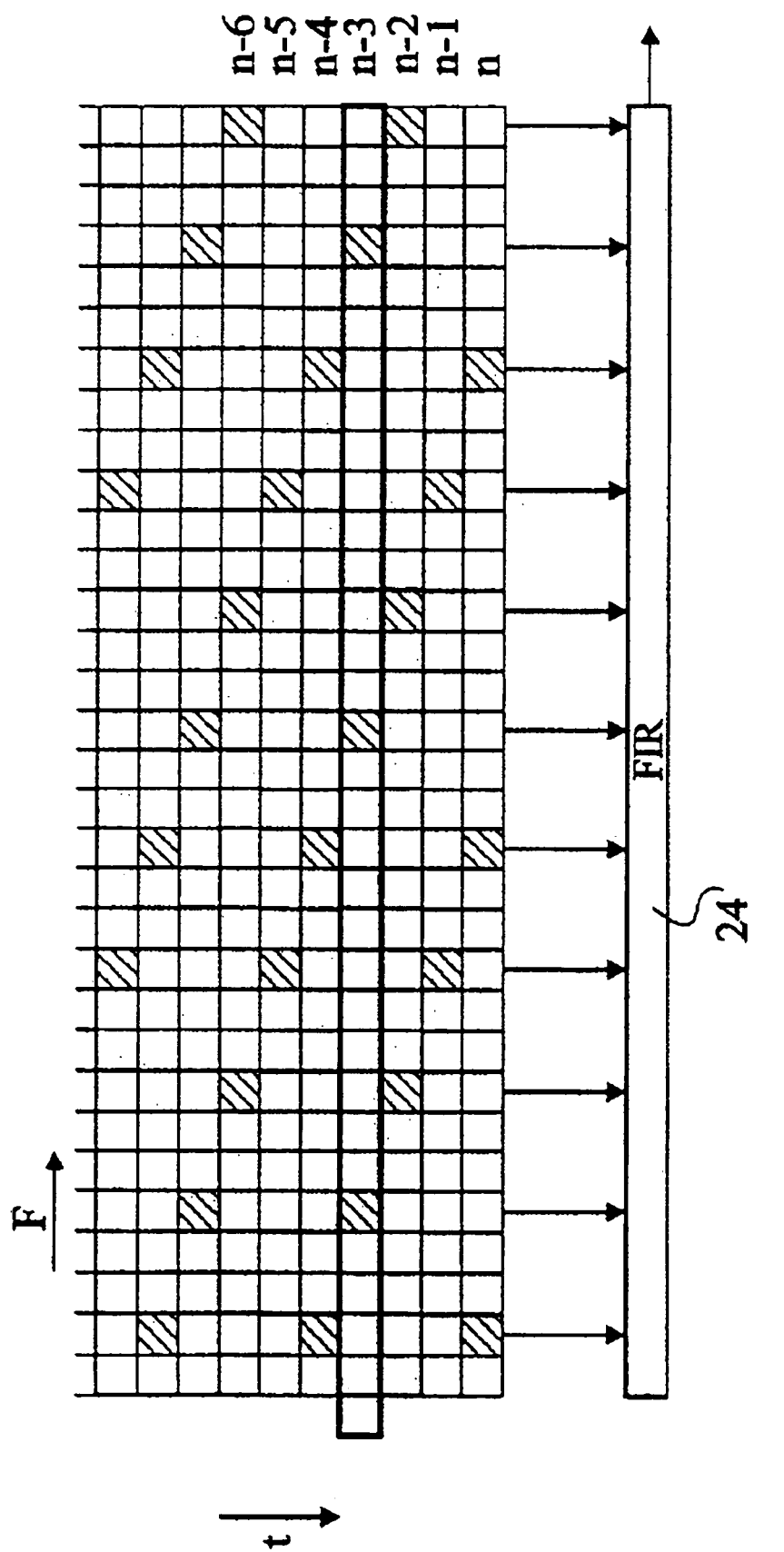
FIG. 5, previously described, illustrates a bidimensional distortion interpolation method.
Figure 6:
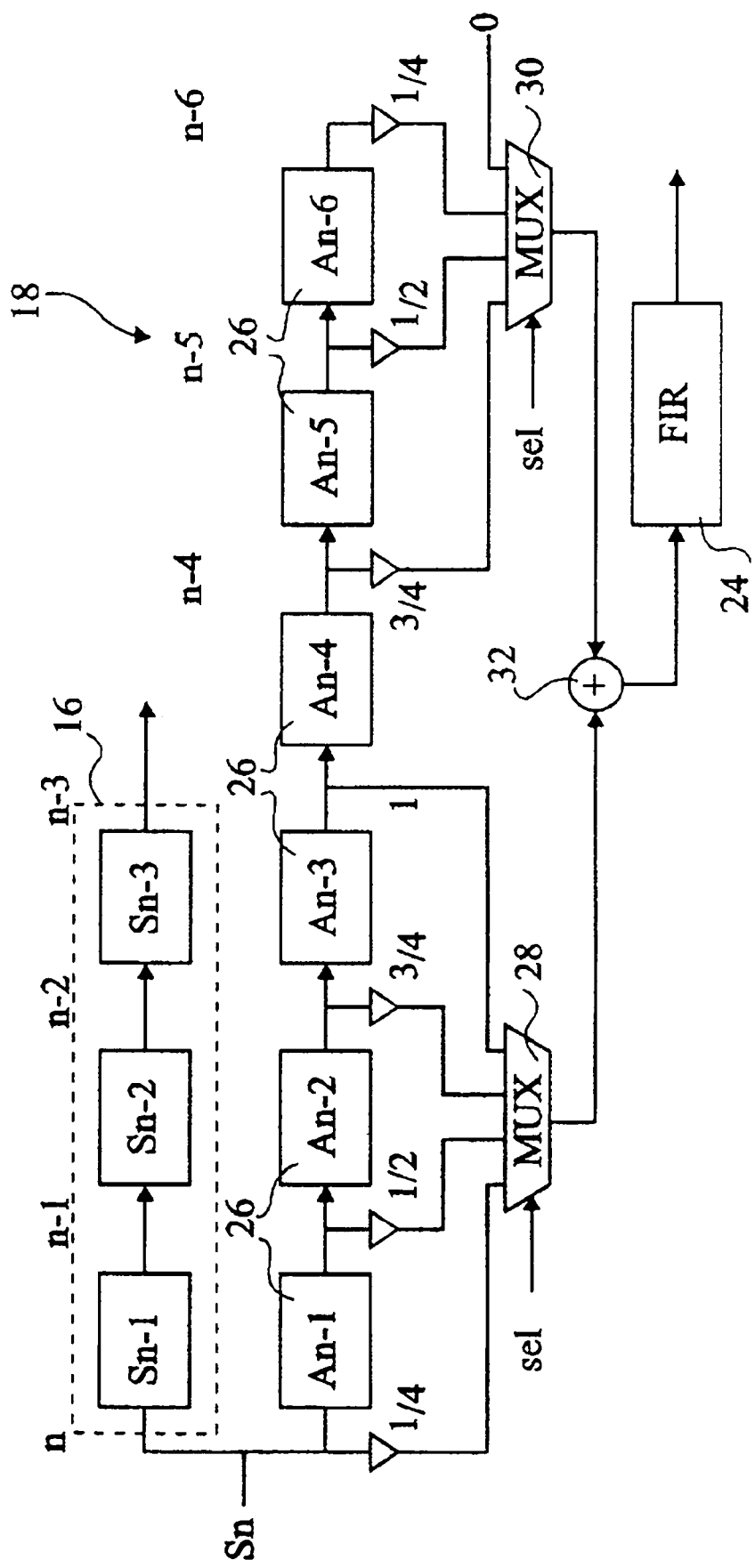
FIG. 6, previously described, schematically shows a circuit enabling implementation of the interpolation of FIG. 5.

In the conventional example of FIGS. 5 and 6, an interpolated distortion $d_{n,k}$ is expressed as:

$$d_{n,k} = \left(1 - \frac{s}{4}\right)A_{n-s,k} + \frac{s}{4}A_{n+4-s,k} \quad (1)$$

where terms A are the received anchors and s=(n modulo 4=k/3 modulo 4) modulo 4.

According to the present invention, distortion $d_{n,k}$ is calculated according to the following relation:

$$d_{n,k} = \left(1 - \frac{s}{4}\right)A_{n-s,k}e^{j2\pi f_k(w_{n-s}-w_n)} + \frac{s}{4}A_{n+4-s,k}e^{j2\pi f_k(w_{n+4-s}-w_n)}$$

where $f_k$ is the frequency corresponding to position k and where each term w corresponds to the absolute position expressed in time units of the analysis window that has been used for the symbol indicated by the index of term w.

Applying this relation amounts to applying conventional relation (1), having previously added to the two received anchors A respective phases corresponding to the shiftings undergone by the analysis window for the symbols associated with the two anchors, and subtracting from the value so obtained the phase corresponding to the shifting undergone by the analysis window for the symbol associated with the interpolated distortion.

Figure 7:
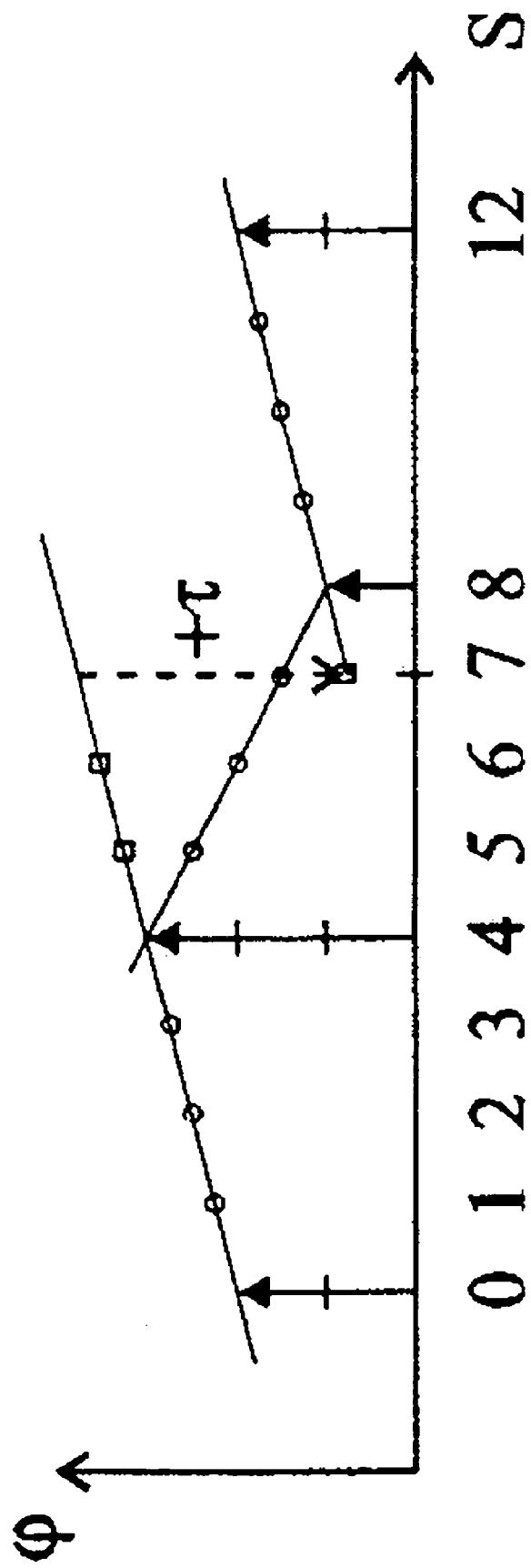
FIG. 7, previously described, illustrates a problem linked to an FFT analysis window readjustment in a conventional demodulator.

If this relation is applied as an example to the interpolation for symbol 6 of FIG. 7, $w_{n-s}=w_4=0$, $w_n=w_6=0$ and $w_{n-s+4}=w_8=\tau$. In other words, the anchor of symbol 4 is not modified while the anchor of symbol 8 is increased by $\tau$, which brings this anchor back in alignment with the received interpolated anchors of symbols 0 to 4 and enables correctly interpolating the anchor for symbol 6, indicated by a square.

Figure 1:
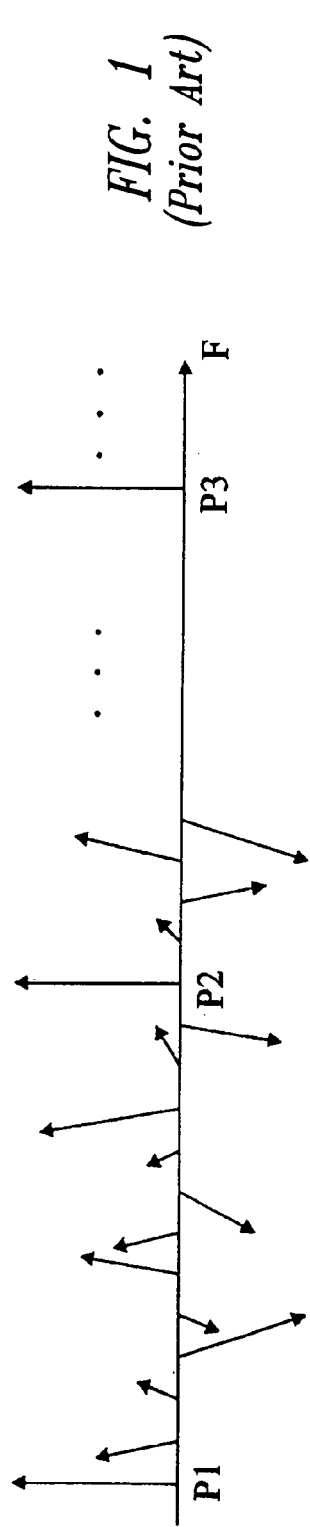
FIG. 1, previously described, illustrates phase and amplitude modulated carriers in a COFDM transmission system.
Figure 2:
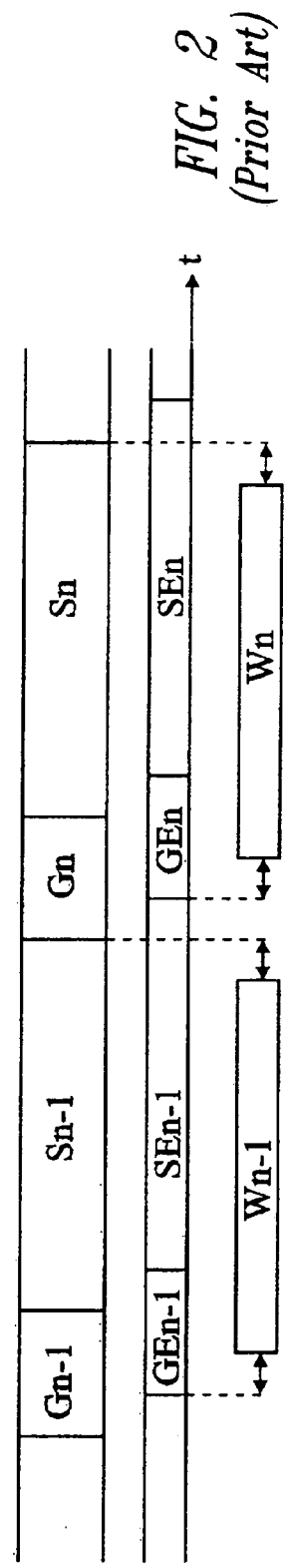
FIG. 2, previously described, shows signals received by a COFDM demodulator and windows of FFT analysis of the signals.
Figure 3:
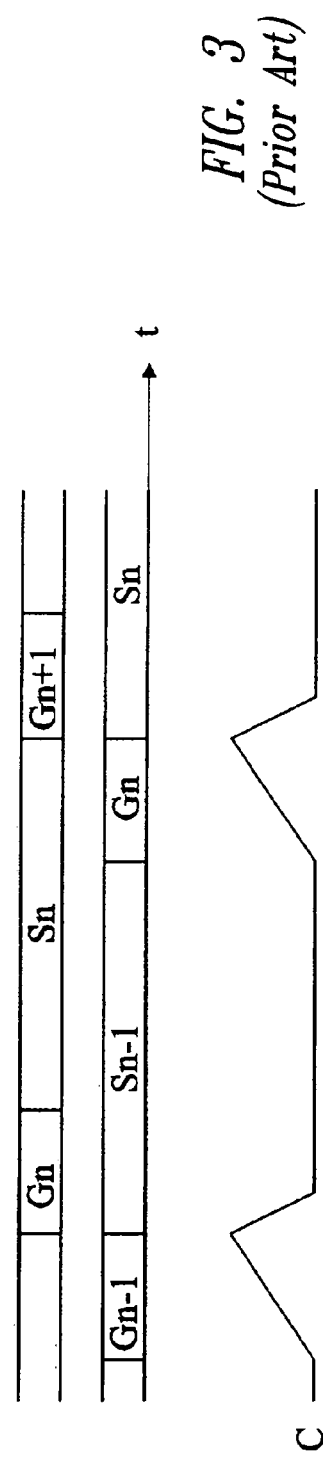
FIG. 3, previously described, illustrates a symbol beginning detection method in a conventional COFDM demodulator.
Figure 4:
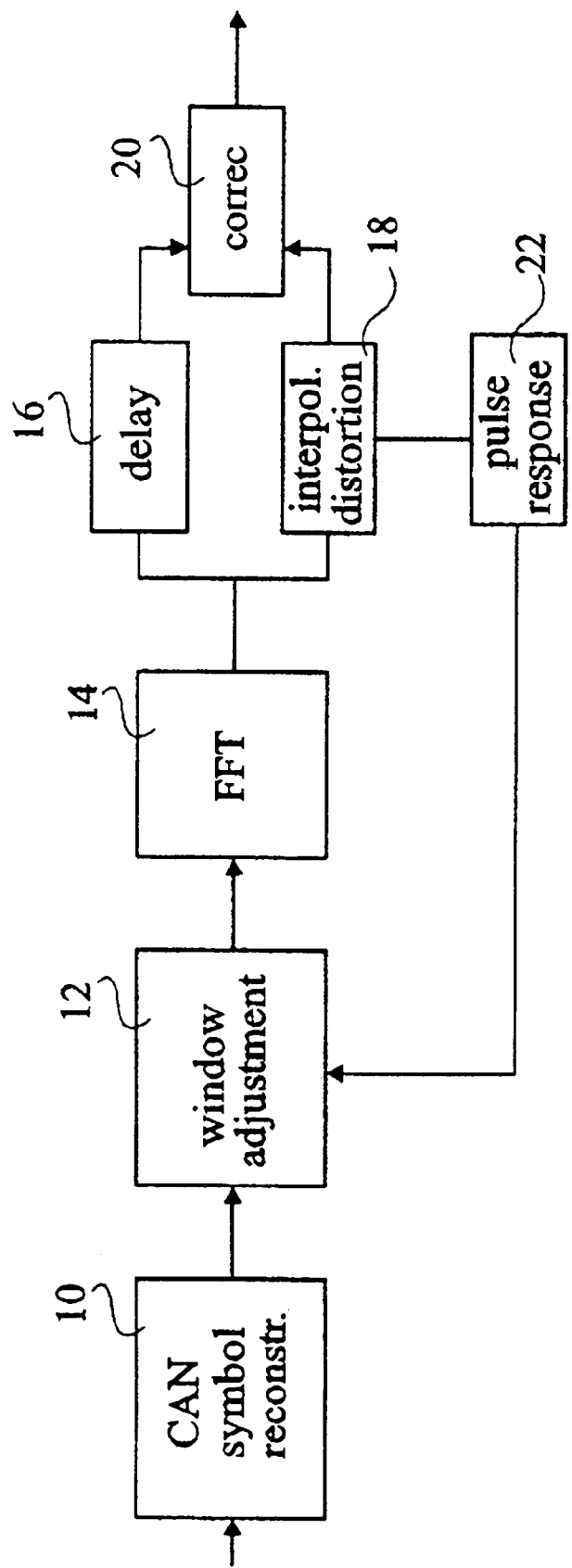
FIG. 4, previously described, schematically shows an architecture of a conventional COFDM demodulator.

As just shown in this example, the present invention can be used in a demodulator of the type in FIG. 4 where the position of the analysis window is conventionally determined at the beginning and readjusted from time to time, as described in relation with FIG. 3.

However, this conventional method of adjusting the analysis window is complex and has up to now required the use of a DSP (digital signal processor). This method has been used because it was important to obtain a precise window position from the beginning, to suppress any need for subsequent adjustment, or at least to postpone as far as possible the subsequent adjustment.

Conversely, according to the present invention, since each anchor is corrected according to the current position of the analysis window, the analysis window may be permanently moving. Thus, it can be envisaged to adjust the position of the analysis window by means of a phase-locked loop (PLL) synchronized on correlation signal C described in relation with FIG. 3.

Figure 8:
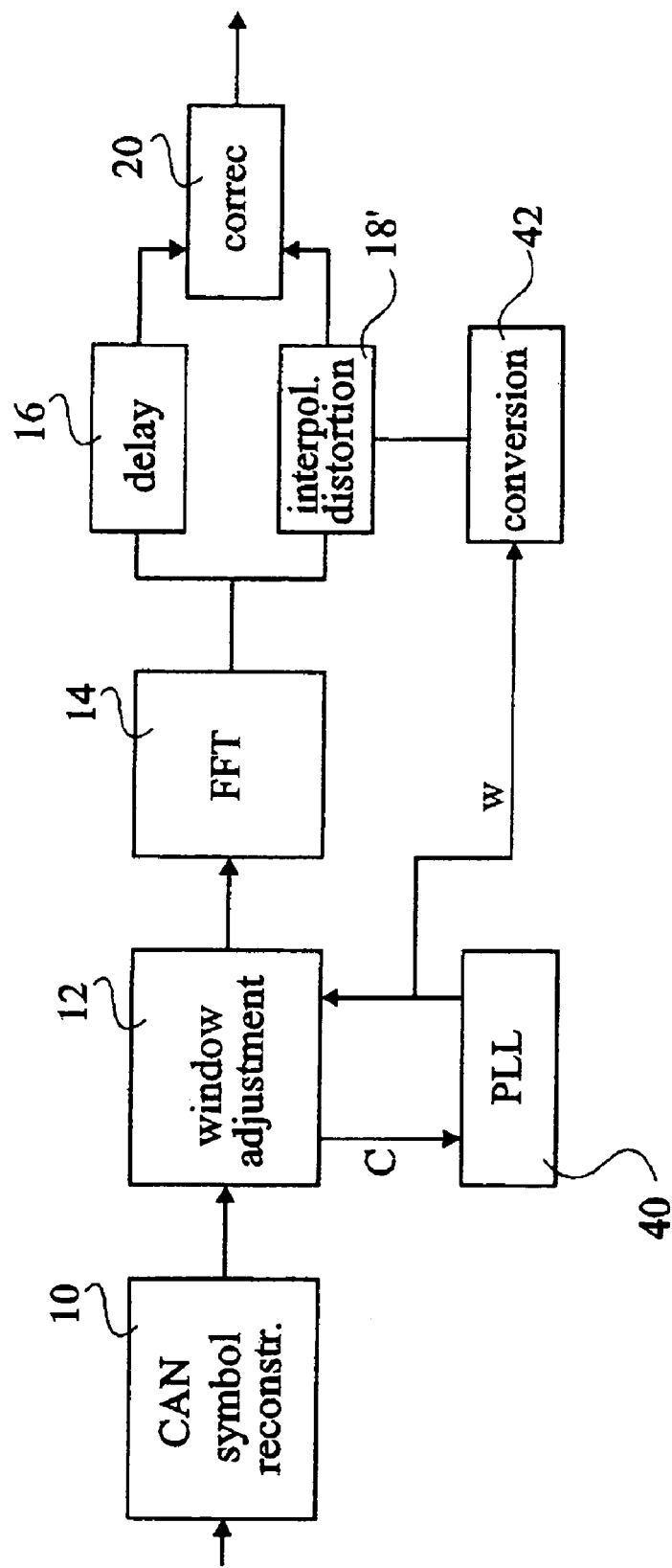
FIG. 8 schematically shows an architecture of a COFDM demodulator according to the present invention.

FIG. 8 shows an architecture of a COFDM demodulator using this method. This architecture is similar to that of FIG. 4, and the same elements are designated with the same reference numbers. Distortion interpolation circuit 18 of FIG. 4 is here replaced with a distortion interpolation circuit 18' according to the present invention. Circuit 12 for setting the window position is permanently controlled by a PLL 40 that synchronizes on correlation signal C described in relation with FIG. 3. Preferably, the PLL is digital; it then includes an accumulator that indicates the absolute position of the analysis window with respect to the corresponding symbol, which position can be directly exploited as a value w. The consecutive values w are converted at 42 to be usable by distortion interpolation circuit 18'.

Figure 9:
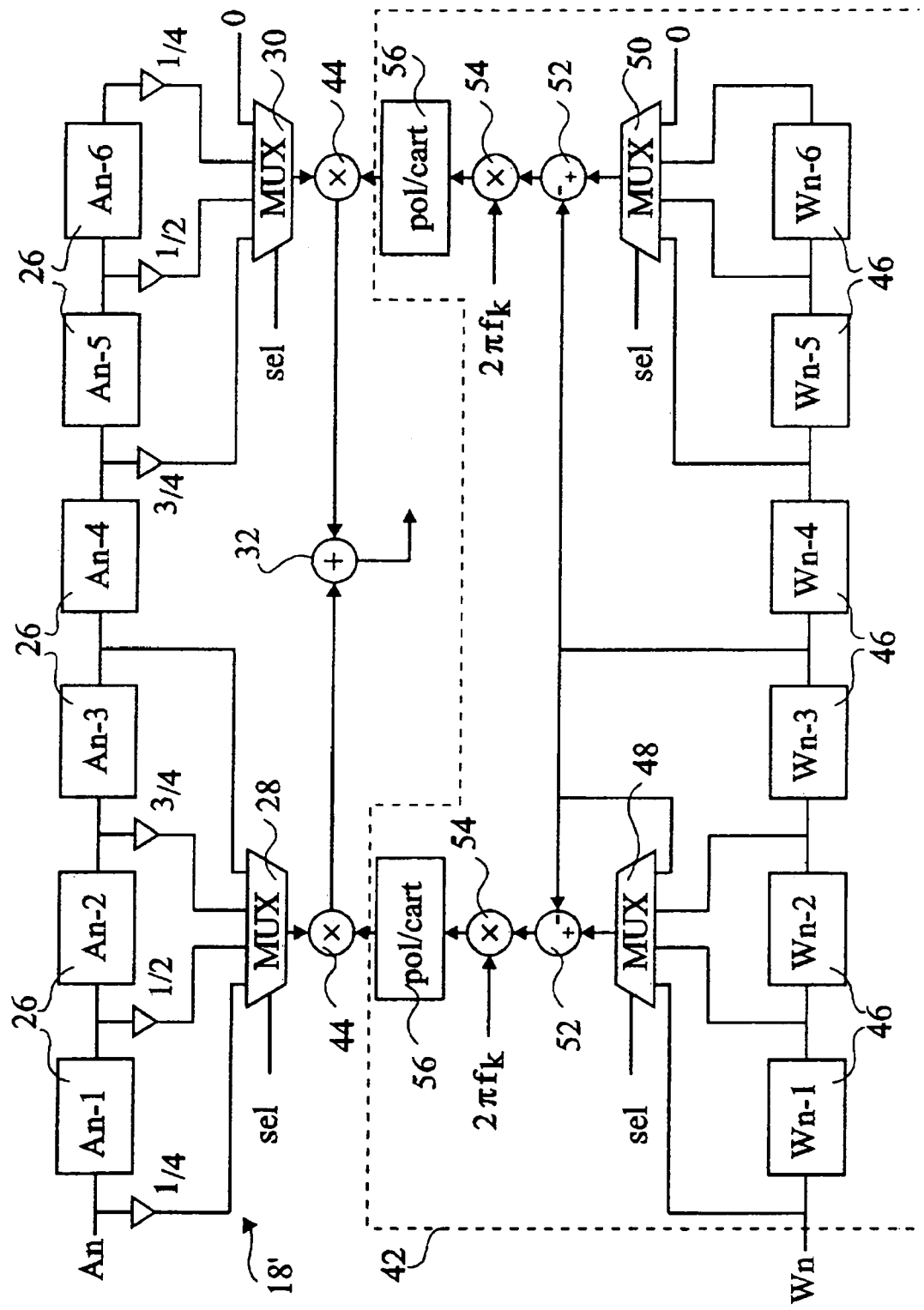
FIG. 9 shows in further detail an element of the demodulator of FIG. 8.

FIG. 9 shows in further detail interpolation circuit 18' and conversion circuit 42. Circuit 18' is similar to that of FIG. 6, and the same references designate the same elements. Circuit 18' differs from circuit 18 in that a complex number multiplier 44 has been inserted at the output of each of multiplexers 28 and 30.

Circuit 42 includes six cascade shift registers 46, a first one of which receives, for each symbol, an analysis window shift value w. Thus, registers 46 store values w for six consecutive symbols and this in concordance with anchors A stored in shift registers 26. A multiplexer 48 respectively receives on four inputs the inputs of the first to fourth registers 46. A multiplexer 50 receives on the three first inputs the respective outputs of the last three registers 46, and on a fourth input value zero. Multiplexers 48 and 50 are controlled by the same selection signal SEL as multiplexers 28 and 30.

Each of multiplexers 48 and 50 is followed by a subtractor 52 that subtracts to the output of the respective multiplexer the output of the third register 46. The outputs of subtractors 52 are provided in the form of complex numbers to the respective multipliers 44 after having been multiplied by $2\pi f_k$ at 54 and having undergone a polar-to-cartesian conversion at 56.

When the last input of the multiplexers is selected, the value provided by interpolation circuit 18' is a received anchor that must not be corrected. In this case, subtractor 52 associated with multiplexer 48 provides a zero value corresponding to complex value 1 that does not modify the received anchor provided by multiplexer 28. This received anchor is not modified either by adder 32, which receives a zero value from multiplier 44 associated with multiplexer 30.

A conventional COFDM demodulator generally includes a multiplier by a complex number of the type $e^{j2\pi f/T}$ at the output of the FFT circuit, where T is half the duration of guard intervals G. Indeed, it is assumed that the analysis windows normally start at the centers of the guard intervals rather than at the beginnings of the symbols, and this multiplication compensates for the resulting shift. This multiplier may advantageously be used in shared time to perform the multiplications required by the present invention.

The invention claimed is:

1. A COFDM demodulator, comprising:
    a fast Fourier transform circuit for analyzing a received signal in a window corresponding to one symbol, each symbol carrying several phase and amplitude modulated carriers, some of which, shifted in frequency in a predetermined way from one symbol to the next one, form pilots, each symbol having a guard interval;
    a bidimensional filter for interpolating from anchors corresponding to the pilots received from several consecutive symbols the distortion undergone by each carrier;
    means for correcting a temporal window shifting with respect to an optimal position, in which two successive windows can be temporally shifted up to the guard interval duration; and
    means for correcting each distortion according to temporal window shifting corrections performed respectively for the symbol associated with the distortion and for the symbols associated with the anchors used to interpolate the distortion.

2. The demodulator of claim 1 wherein the means for correcting the window shifting comprise a phase-locked loop synchronized on a correlation signal obtained by a correlation product between the received signal and this same signal delayed by one symbol, each symbol being preceded by a guard interval corresponding to a copy of the end of the symbol.

3. The demodulator of claim 1 wherein each distortion is, in the frequency field after Fourier transform, a weighted sum of two anchors of the same position in a preceding symbol and in a following symbol, to which anchors have been added respective phases corresponding to the shiftings undergone by the analysis window for the preceding and following symbols, and to which anchors has been subtracted a phase corresponding to the shifting undergone by the analysis window for the symbol associated with the distortion.

4. A COFDM demodulator with fast Fourier transform (FFT) analysis window displacement compensation comprising:
    a reconstruction circuit configured to receive radio-transmitted signals in a window corresponding to one symbol, the symbol carrying a plurality phase and amplitude modulated carriers, one or more of the carriers are shifted in frequency in a predetermined way from one symbol to the next symbol and form pilots, the reconstruction circuit configured to extract the symbols and convert the symbols into digital signals;
    an adjustment circuit and an associated phase-locked loop (PLL) circuit configured to receive the digital signals and determine and readjust the position of the corresponding windows;
    an FFT circuit configured to perform a fast Fourier transform with the windows and output a transformed signal including complex coefficients;
    a conversion circuit configured to receive a position signal from the PLL and to output a conversion signal that is corrected for distortion, the conversion circuit comprising first, second, and third analysis window shift value registers coupled to a first multiplexer; fourth, fifth, and sixth analysis window shift value registers coupled to a second multiplexer; the first and second multiplexers each having an output coupled to respective inputs of first and second adders; the first and second adders each having an output coupled to respective first and second multipliers; the first and second multipliers each having an output coupled to respective first and second polar-to-cartesian converters; and the first and second polar-to-cartesian converters each having an output coupled to respective second inputs of first and second multipliers of a distortion interpolation circuit;
    the distortion interpolation circuit configured to receive the transformed signal and the conversion signal and to provide an interpolated distortion signal, the interpolation circuit comprising first, second, and third anchor input registers coupled to a first multiplexer; fourth, fifth, and sixth anchor input registers coupled to a second multiplexer; and first and second multipliers each having inputs coupled respectively to the first and second multiplexers, and each further having an output coupled to a common adder; and
    a correction circuit configured to receive the interpolated distortion signal and to output a corrected complex coefficients signal.

5. The demodulator of claim 4, further comprising a delay circuit coupled between the FFT circuit and the correction circuit and coupled in parallel with the distortion interpolation circuit.

6. The demodulator of claim 4 wherein the PLL is configured to be synchronized on a correlation signal obtained by a correlation product between the received radio-transmitted signals in a window and this same signal delayed by one symbol, each symbol being preceded by a guard interval corresponding to a copy of the end of the symbol.

7. The demodulator of claim 4 wherein the PLL comprises an accumulator that outputs the absolute position of the window with respect to a corresponding symbol.

8. The demodulator of claim 7 wherein the conversion circuit is configured to convert the absolute position received from the PLL into a form that is usable by the distortion interpolation circuit.

9. The demodulator of claim 4 wherein the PLL is configured to control the adjustment circuit.

10. The demodulator of claim 4 wherein the first and second multipliers of the interpolation circuit comprise complex multipliers.

11. The demodulator of claim 4 wherein the interpolation circuit is configured to calculate distortion according to the following:

$$d_{n,k} = \left(1 - \frac{S}{4}\right) A_{n-s,k} e^{j2\pi f_k (w_{n-s} - w_n)} + \frac{S}{4} A_{n+4-s,k} e^{j2\pi f_k (w_{n+4-s} - w_n)}$$

where
   A is the received anchors,
   S is equal to (n modulo 4−k/3 modulo 4) modulo 4,
   n is the symbol number,
   k is the window position,
   $f_k$ is the frequency corresponding to position k, and
   w is the absolute window position expressed in time units of the associated window.

12. A method of fast Fourier transform (FFT) analysis window displacement compensation in a COFDM modulator, comprising:
   receiving a radio-transmitted signal in a window corresponding to one symbol, the symbol carrying a plurality of phase and amplitude modulated carriers, one or more of the carriers are shifted in frequency from one symbol to the next symbol to form pilots, and extracting these symbols and converting these symbols into digital signals;
   receiving the digital signals and determining and readjusting the position of the windows;
   receiving the windows and performing a fast Fourier transform with the windows and outputting a transformed signal that includes complex coefficients;
   receiving a position signal and outputting a conversion signal that is corrected for distortion, comprising calculating distortion according to the following:

$$d_{n,k} = \left(1 - \frac{S}{4}\right) A_{n-s,k} e^{j2\pi f_k (w_{n-s} - w_n)} + \frac{S}{4} A_{n+4-s,k} e^{j2\pi f_k (w_{n+4-s} - w_n)}$$

where
   A is the received anchors,
   S is equal to (n modulo 4−k/3 modulo 4) modulo 4,
   n is the symbol number,
   k is the window position,
   $f_k$ is the frequency corresponding to a position k, and
   w is the absolute window position expressed in time units of the associated window;
receiving the transformed signal and the conversion signal, including anchors corresponding to pilots received from several consecutive symbols, and providing an interpolated signal of distortion undergone by each carrier; and
receiving the interpolated signal and outputting a corrected coefficient signal.

13. The method of claim 12, further comprising receiving the transformed signal and outputting a delayed transformed signal.

14. The method of claim 12, further comprising generating a phase-locked loop signal synchronized on a correlation signal obtained by a correlation product between the received signal and this same signal delayed by one symbol, each symbol being preceded by a guard interval corresponding to a copy of the end of the symbol.

\* \* \* \* \*